Feb. 18, 1941.   F. S. BARKS   2,232,359
LUBRICATION FITTING
Filed Dec. 24, 1937

Frank S. Barks,
Inventor.
Delos G. Haynes,
Attorney.

Patented Feb. 18, 1941

2,232,359

UNITED STATES PATENT OFFICE 2,232,359

LUBRICATION FITTING

Frank S. Barks, St. Louis, Mo., assignor to Lincoln Engineering Company, St. Louis, Mo., a corporation of Missouri Application December 24, 1937, Serial No. 181,513

20 Claims. (Cl. 184—105)

This invention relates to fittings for lubrication, and with regard to certain more specific features, to lubricant delivering fittings for association with lubricant guns and the like.

The invention is an improvement upon the structure disclosed in United States Patents 2,082,521, of F. K. Schneider et al., dated June 1, 1937, and 2,086,071, of F. H. Ehnts, dated July 6, 1937.

Among the several objects of the invention may be noted the provision of a lubricant fitting in which a vent is employed with means for carrying incoming lubricant past said vent, wherein said means for carrying the lubricant past the vent is extended to a point below the lower end of the fitting, whereby trapping of air is prevented within the space to be lubricated; the provision of a fitting of the class described constituting an article of manufacture wherein said lubricant-carrying means and the vent are organized compactly as a small unit including valved lubricant-receiving elements; and the provision of an article of the class described which may be made in large quantities at small costs on production apparatus, such as screw machines or the like. Other objects will be in part obvious and in part pointed out hereinafter.

In the accompanying drawing, in which are illustrated several of various possible embodiments of the invention—

Similar reference characters indicate corresponding parts throughout the several views of the drawing.

Figure 1:
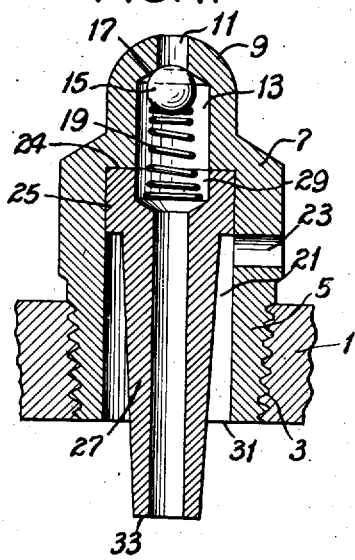
Fig. 1 is a vertical section showing one form of fitting.
Figure 2:
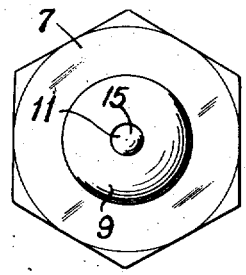
Fig. 2 is a plan view of Fig. 1.

Referring now more particularly to Fig. 1, there is fragmentarily shown at numeral 1 a boundary member for a lubricant-receiving or lubricant compartment. This lubricant compartment may have therein a bearing or other device to be lubricated.

The boundary member 1 is provided with a threaded opening 3 for receiving the threaded lower end 5 of the hollow body of the fitting 7.

The body 7 has a rounded lubricant-receiving tip 9 which is adapted to cooperate with a lubricant nozzle of a lubricant gun or the like to effect a seal in known manner.

The lubricant-receiving tip has a lubricant-receiving opening 11 which leads into an enlarged counterbore 13. A ball check valve 15 is thrust against a seat 17 (between the opening 11 and counterbore 13). The check valve 15 is normally pressed to its seat by a spring 19.

The counterbore 13 extends downwardly and communicates with a second and larger counterbore 21 which extends down through the threaded lower end of the fitting. This gives the body 7 a hollow, cylindric form at its base.

A small opening 23 in the body 7 forms a communication or connection between the counterbore 21 and the exterior of the fitting. This opening 23 is of the order of $\frac{1}{16}$ of an inch in diameter and the other dimensions of the fitting are substantially in the proportion shown in Fig. 1. These dimensions are given, not by way of limitation, but to illustrate the compact characteristics of the article.

Between the counterbores 13 and 21 is a right-angular shoulder or abutment 24. This shoulder is abutted by the enlarged head 25 of a lubricant-transmitting tube 27. The head portion 25 of the tube 27 has a force-fit in the counterbore 21. The head is forced up against the shoulder 24.

A counterbore 29 in the head 25, the same size as the counterbore 13, serves to form a socket for receiving the lower end of the spring 19. The reaction of the spring 19 in the pocket 29 serves to hold the check valve against the seat 17. In view of the force-fit between the head 25 and the counterbore 21, the reaction of the spring is not capable of pushing the tube 27 out of the counterbore 21.

A feature of the invention is that the tube 27 is carried downwardly to a point below the lower end 31 of the main body of the fitting. This condition is shown in Fig. 1 wherein the lower end 33 of the tube 27 is shown lower than the lower end 31 of the body of the fitting. The outside of the tube 27 is smaller than the inside of the counterbore 21 and is also tapered so as to facilitate the entry of air into the space between the tube 27 and the counterbore 21.

From the above, it will be seen that if a sealed connection be made between a lubricant gun and the tip 9, lubricant may be forced from the gun through the receiving opening 11, the pressure automatically opening the check valve 15. The lubricant proceeds down through the counterbores 13, 29 and through the tube 27. The lubricant thus by-passes the opening 23 and the lower end of the counterbore 21. The lubricant thus is positively placed at a point below the lower end of the fitting. Hence, any gathered air in the lubricant compartment is forced from the top of the incoming grease, as said grease fills the compartment. The air is expelled through the passages 21 and 23.

Thus the chances that air may be trapped in the lubricant compartment are much reduced. This practically assures that the lubricant compartment will be properly filled with lubricant, besides providing a vent for determining when the compartment is full and for preventing excessive internal pressure.

Another advantage of the invention is the simplicity of the construction and its compactness, whereby it may be used as an integral part of the small sizes of fittings employed in automotive lubrication and the like. For example, the fitting shown in Fig. 1 has a diameter at the base of the tip 9 of only ¼ inch and its over-all length, including the lower extension 23 of the tube 27, is of the order of 1⅜ of an inch.

As above indicated, the vent 23 has the incidental advantage of preventing the application of excessive pressure within the bearing compartment and of thus reducing the churning friction of ball bearings and the like.

Figure 3:
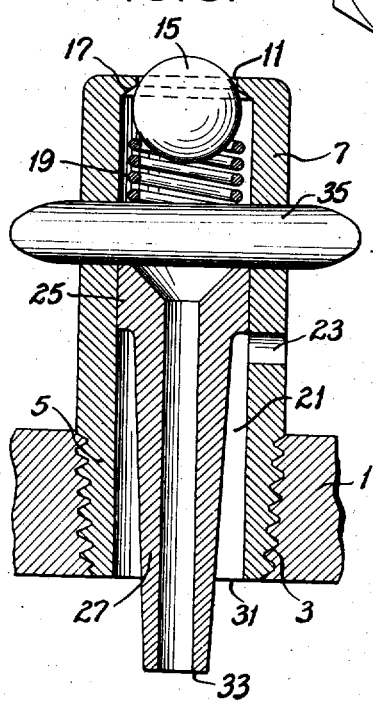
Fig. 3 is a view similar to Fig. 1 showing a first alternative form.
Figure 4:
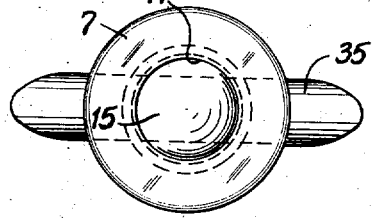
Fig. 4 is a plan view of Fig. 3.

In Figs. 3 and 4 is shown the application of the invention to a so-called pin type of fitting, in which like numerals designate like parts. However, in this case, the body portion 7 has a continuous counterbore 21, instead of the combination of counterbores 21 and 13 shown in Fig. 1.

Crosswise of the counterbore 21 and placed through suitable openings in the wall 7 is a pin 35, the purpose of which is to cooperate with a bayonet coupler of the class often used on grease guns. Sealing is accomplished at the end of the body portion 7 and around the inlet opening 11. It will be seen that the seat 17 in this case is between the inlet opening 11 and the continuous counterbore 21.

In Fig. 3, as in Fig. 1, the head 25 of the lubricant-transmitting tube 27 has a force-fit in the counterbore 21, but in this case it abuts the lower side of pin 35, instead of a specially formed shoulder. In this form of fitting, the spring 19 reacts against the pin 35. Hence, the pin 35 has three functions, that is, (1) to afford a reaction point for the spring 19, (2) cooperation with the bayonet coupler, and (3) a limiting stop against further forcing in of the head 25 of the tube 27.

The operation of the invention shown in Fig. 3 is substantially the same as that shown in Fig. 1, although the mode of coupling and sealing between the lubricant gun and fittings are different in a manner which is known.

Figure 5:
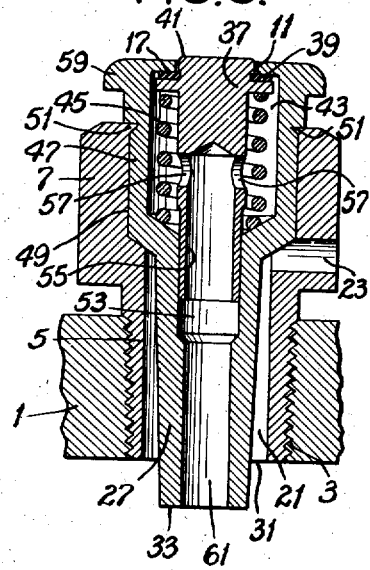
Fig. 5 is a view similar to Fig. 1 showing a second alternative form.
Figure 6:
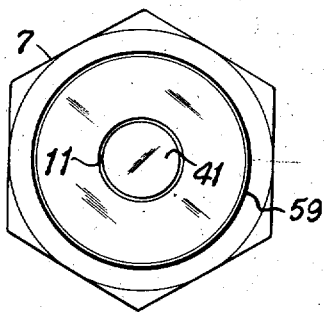
Fig. 6 is a plan view of Fig. 5.

In Fig. 5 is shown another type of fitting in which like numerals designate like parts.

In this case the check valve is not of the ball type but of the disc type, such as shown at numeral 37. This valve has a separate seal 39 which is pressed against the seat 17 and also carries a pilot 41 which passes through the lubricant-receiving opening 11.

The valve 37 is arranged in a counterbore 43. A spring 45 normally pushes the valve shut and reacts on the bottom of the counterbore 43.

In this form of the invention the lubricant-transmitting tube 27 is formed integrally with the cup-shaped member 47 (which carries the counterbore 43), and said member 47 is pressed from the top into an opening 49 of the body 7, certain lip portions 51 being automatically curled into clinching position in a groove during the assembly operation, as described in Patent 2,153,330 of Jonathan Kludt, for lubricant fitting, dated April 4, 1939.

The feature of the clinch at 51 upon assembly comprises no part of the present invention and the same is accordingly not claimed herein. It is to be understood that the clinching method of assembly facilitates the use of the extension 27.

Extending downwardly from the counterbore 43 is a smaller counterbore 53 in which slides the hollow lower end 55 of the valve 37. The hollow portion of the valve communicates or connects with the counterbore 43 through openings 57.

The member 47 carries a head 59 by which the coupling connection is made with a suitable lubricant gun. The coupling effects opening of the valve 37 and lubricant then flows through the inlet opening 11, counterbore 43, and into the openings 57 to be delivered downwardly into the counterbore 53. It then passes out through a passage 61 and the lower outlet end 33 of the tube 27.

From the above it will be seen that one common feature of the three forms of the invention disclosed is the inlet opening with a check valve associated therewith. Secondly, each has a relief port 23 in the body portion of the fitting. This is by-passed by a lubricant-transmitting tube 27. The tube 27 not only by-passes the outlet port 23, but passes through the lower end of the fitting to a point below its lowermost end. Another common feature is that the lubricant-transmitting tube 27 is organized with the body portion of the fitting simply by a forced fit.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. As an article of manufacture, a hollow lubricant-receiving fitting comprising a body portion adapted to be attached to a lubricant compartment and having a lubricant inlet, a valve behind the inlet, a lubricant-transmitting tube associated with the body portion, said tube having an opening between said inlet when said valve is open and the inside of said lubricant compartment, said tube being formed to allow an annular space between part of it and the hollow interior of the body portion, and said tube being of a length adapted to extend downwardly below the lower end of said body portion.

2. As an article of manufacture, a hollow lubricant-receiving fitting comprising a body portion adapted to be attached to a lubricant compartment and having a lubricant inlet, a valve behind the inlet, a lubricant-transmitting tube associated with the body portion, said tube having an opening between said inlet when said valve is open and the inside of said lubricant compartment, said tube being formed to allow an annular space between part of it and the hollow interior of the body portion, and said tube being of a length adapted to extend downwardly below the lower end of said body portion, said body portion having a relief opening between the region surrounding said tube and the exterior.

3. A lubricant-receiving fitting for attachment to a lubricant compartment comprising a body having an opening communicating with said compartment, said body having a relief port between said opening and the exterior of the fitting on the outside of the lubricant compartment, said body also having an inlet opening, and a lubricant-transmitting tube passing within the body and spaced with respect thereto, said tube extending downwardly to a point below the body portion of the fitting and communicating between said inlet opening and said outlet opening but separating said inlet opening from said relief port at points within the fitting.

4. A lubricant-receiving fitting for attachment to a lubricant compartment comprising a body having an opening communicating with said compartment, said body having a relief port between said opening and the exterior of the fitting on the outside of the lubricant compartment, said body also having an inlet opening, and a lubricant-transmitting tube passing within the body and spaced with respect thereto, said tube extending downwardly to a point below the body portion of the fitting and communicating between said inlet opening and said outlet opening but separating said inlet opening from said relief port at points within the fitting, said tube having a head portion arranged with a forced fit within said body portion.

5. A lubricant-receiving fitting comprising a body portion having means at its lower end for attachment to a lubricant compartment, a lubricant-receving head thereon, said head having a lubricant-receiving opening and an enlarged opening behind said lubricant-receiving opening and passing through the fitting, a check valve associated with the lubricant-receiving opening, a spring for said valve arranged in said enlarged opening, the body portion of the fitting having a relief communicating between said enlarged opening and the exterior, and a lubricant-transmitting tube having a forced fit with respect to said enlarged opening, and by-passing said outlet and extending to a point below the lower end of the fitting.

6. A lubricant-receiving fitting comprising a body having a lubricant-receiving opening, an opening communicating with said lubricant-receiving opening and passing through the fitting, the body having an outlet communicating between said last-named opening and the exterior, and a lubricant-transmitting tube in said last-named opening and communicating with said inlet, said tube by-passing said outlet and extending to a point below the lower end of the fitting.

7. A lubricating-receiving fitting comprising a body portion having means at its lower end for attachment to a lubricant compartment, a lubricant-receiving head thereon having a lubricant-receiving opening, an enlarged opening behind said lubricant-receiving opening and passing through the fitting, a check valve associated with the lubricant-receiving opening, a spring for said valve arranged in said enlarged opening, the body portion of the fitting having a relief outlet communicating between said enlarged opening and said exterior, and a lubricant-transmitting tube having a forced fit with respect to said enlarged opening, and by-passing said relief outlet and extending to a point below the lower end of the fitting.

8. A lubricant-receiving fitting comprising a body portion having a lower end adapted to be attached to a lubricant compartment, a lubricant-receiving opening in said fitting, said fitting being hollow and having an outlet relief opening communicating between the hollow portion and the outside thereof, and a lubricant-transmitting tube passing from a point below the hollow portion of the fitting and by-passing lubricant with respect to said outlet relief opening.

9. A lubricant-receiving fitting comprising a hollow body portion having a threaded lower end, said body portion having a lubricant-receiving opening at one end and a relief outlet between said lubricant-receiving opening and the thread, and a lubricant-transmitting tube in the hollow portion of the body adapted to transmit lubricant from said inlet opening past the outlet and to a point below the lower end of the fitting.

10. A lubricant-receiving fitting comprising a hollow, cylindric body portion having a threaded lower end, said body portion having a lubricant-receiving opening at one end and a relief outlet between said lubricant-receiving opening and the thread, and a lubricant-transmitting tube in the hollow portion of the body adapted to transmit lubricant from said inlet opening past the outlet and to a point below the lower end of the fitting, said tube having a forced fit within the cylindric hollow portion of the fitting.

11. A lubricant-receiving fitting comprising a body portion having a lubricant-receiving inlet, a threaded lower end adapted to thread into an opening in a lubricant compartment, said body being hollow, a pin traversing the body portion through its hollow part, a valve associated with said lubricant-receiving opening, a spring biasing said valve to a seat reacting against said pin, said body portion having a cylindric hollow portion, a relief outlet between said cylindric hollow portion and the exterior, and a lubricant-transmitting tube having a head providing a forced fit within said cylindric hollow portion, said tube being of smaller outside diameter than inside diameter of said hollow portion and having a length adapted to transmit lubricant past said outlet and past the lower end of the fitting.

12. A lubricant-receiving fitting comprising a body portion having a threaded lower end, said body portion having a lubricant-receiving opening at its other end, said body being hollow and cylindric interiorly, a relief outlet between its hollow portion and the exterior, and a tubular portion having a head adapted to be pressed with a forced fit into said hollow portion, said head being arranged between said inlet and said relief outlet and said tubular portion being otherwise smaller than said hollow portion of the body and having a length to extend below the lowermost point of said body portion.

13. A lubricant-receiving fitting comprising a body portion having a threaded lower end, said body portion having a lubricant-receiving opening at its other end, said body being hollow and cylindric interiorly, a relief outlet between its hollow portion and the exterior, and a tubular portion having a head adapted to be pressed with a forced fit into said hollow portion, said head being arranged between said inlet and said relief outlet and said tubular portion being otherwise smaller than said hollow portion of the body and having a length to extend below the lowermost point of said body portion and being exteriorly tapered toward its lower end.

14. A fitting comprising a body portion having a hollow passage therethrough, an outlet between said passage and the exterior of the fitting, means fastening said fitting to a lubricant compartment, a member within the hollow portion of the body having a lubricant-receiving inlet, a valve associated with said inlet, said member having a tube extending through and clearing the inside surface of said passage, the tube extending to a point below the lowermost end of the fitting and permitting communication between the lubricant compartment and said outlet.

15. A lubricant-receiving fitting comprising a body portion having a passage therethrough including an inlet, a relief outlet, and a tubular member arranged within said fitting to communicate with said inlet but preventing communication between said inlet and said outlet in the body portion except by way of the tubular portion, the tubular member having a diameter less than the inside diameter of said body portion and a length adapted to carry lubricant to a point below the end of the body portion.

16. A lubricant-receiving fitting comprising a body portion having a passage therethrough including an inlet, a relief outlet, and a tubular member arranged within said fitting to communicate with said inlet but preventing communication between said inlet and said outlet in the body portion except by way of the tubular portion, the tubular member having a diameter less than the inside diameter of said body portion and a length adapted to carry lubricant to a point below the end of the body portion, said tubular member having a head which force fits the passage in the body portion and is located between said relief outlet and said inlet.

17. A lubricant-receiving fitting comprising a body portion having a passage therethrough including an inlet, a relief outlet, and a tubular member arranged within said fitting to communicate with said inlet but preventing communication between said inlet and said outlet in the body portion except by way of the tubular portion, the tubular member having a diameter less than the inside diameter of said body portion and a length adapted to carry lubricant to a point below the end of the body portion, said tubular member having a head which force fits the passage in the body portion and is located between said relief outlet and said inlet and being tapered downwardly.

18. As an article of manufacture, a lubricant-receiving fitting comprising a member adapted to be attached to a lubricant housing and having a plurality of passages therein, each passage opening into said housing, but one passage opening below the other and being concentric to said other passage, said fitting having exteriorly of the housing an inlet communicating with the passage that opens below the other, and having an outlet communicating with the other passage, a valve associated with the inlet, and means for biasing said valve toward the inlet.

19. A lubricating fitting comprising a tubular casing having means for engagement with a source of viscous lubricant, means for attachment to a member for receiving the lubricant upon discharge from the fitting under pressure, a tubular element disposed within the bore of said casing in spaced relation to the wall of said bore and projecting a substantial distance beyond the end of the casing, and said casing having an opening therein providing open communication between the exterior of the casing and the space between the wall of the casing bore and the outer wall of the tubular element.

20. A lubricant-receiving fitting comprising a hollow body adapted to be attached to, and to communicate with, a lubricant compartment, said body having an outlet to a point outside of said compartment, a cup-shaped member in said body and closing it above said outlet, a tubular extension from said cup-shaped member passing through the hollow body to a point below the lower end of the body and allowing an annular space between it and the body with which said outlet communicates, said cup-shaped member having a lubricant-receiving inlet, and a valve normally biased toward said inlet and located in the cup-shaped member.

FRANK S. BARKS.